United States Patent
Lee et al.

(10) Patent No.: US 7,499,102 B2
(45) Date of Patent: Mar. 3, 2009

(54) IMAGE PROCESSING APPARATUS USING JUDDER-MAP AND METHOD THEREOF

(75) Inventors: Young-ho Lee, Yongin-si (KR); Seung-joon Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 589 days.

(21) Appl. No.: 11/237,975

(22) Filed: Sep. 29, 2005

(65) Prior Publication Data

US 2006/0077292 A1    Apr. 13, 2006

(30) Foreign Application Priority Data

Oct. 8, 2004    (KR) .................... 10-2004-0080324

(51) Int. Cl.
*H04N 7/01* (2006.01)

(52) U.S. Cl. .................... 348/441; 348/448; 348/452

(58) Field of Classification Search ............ 348/448, 348/441, 452, 451, 458, 459; *H04N 7/01, H04N 11/20*
See application file for complete search history.

(56) References Cited

U.S. PATENT DOCUMENTS

| 2,149,703 | A | 3/1939 | Dyes |
| 4,239,802 | A | 12/1980 | Smith et al. |
| 6,266,092 | B1 | 7/2001 | Wang et al. |
| 6,611,294 | B1 * | 8/2003 | Hirano et al. ............. 348/459 |
| 7,349,029 | B1 * | 3/2008 | Chou ..................... 348/448 |

2002/0075412 A1   6/2002  Tang et al.

FOREIGN PATENT DOCUMENTS

| CN | 1046437 | 3/2003 |
| JP | 06-233182 | 8/1994 |
| JP | 2003-116109 | 4/2003 |
| JP | 2004-064788 | 2/2004 |

(Continued)

OTHER PUBLICATIONS

Japanese Office Action dated Jun. 17, 2008 issued in JP 2005-295081.

(Continued)

*Primary Examiner*—Sherrie Hsia
(74) *Attorney, Agent, or Firm*—Stanzione & Kim, LLP

(57) ABSTRACT

An image processing apparatus using a judder-map and a method thereof. The image processing apparatus using a judder-map includes: a field storage block to receive an input interlaced video signal including an input image having a plurality of consecutive fields, a film detecting block to receive the plurality of the consecutive fields from the field storage block and to detect whether the input image is an image in a film mode, a judder-map generating block to detect judder created on a pixel or block of neighboring fields among the plurality of consecutive fields provided from the field storage block to generate a judder-map, and an image interpolating block to perform image interpolation using the judder-map if the input video signal is detected to be an image in the film mode and to generate and output a progressive video signal. The image processing apparatus prevents the creation of judder on CGI (Computer Graphic Imagery) or subtitles, to which pulldown technologies are not applied.

30 Claims, 6 Drawing Sheets

FOREIGN PATENT DOCUMENTS

| | | |
|---|---|---|
| KR | 2002-26153 | 4/2002 |
| KR | 2003-29507 A | 4/2003 |

OTHER PUBLICATIONS

Chinese Office Action dated Jul. 4, 2008 issued in CN 200510105620.2.

"Motion Adaptive De-Interlacing Algorithm with 3-2 Pull Down Detection", Gongming LU, Journal of Najing University of Posts and Telecommunications, vol. 24, No. 3, p. 55-56, Sep. 2004.

European Search Report, Feb. 2006.

* cited by examiner

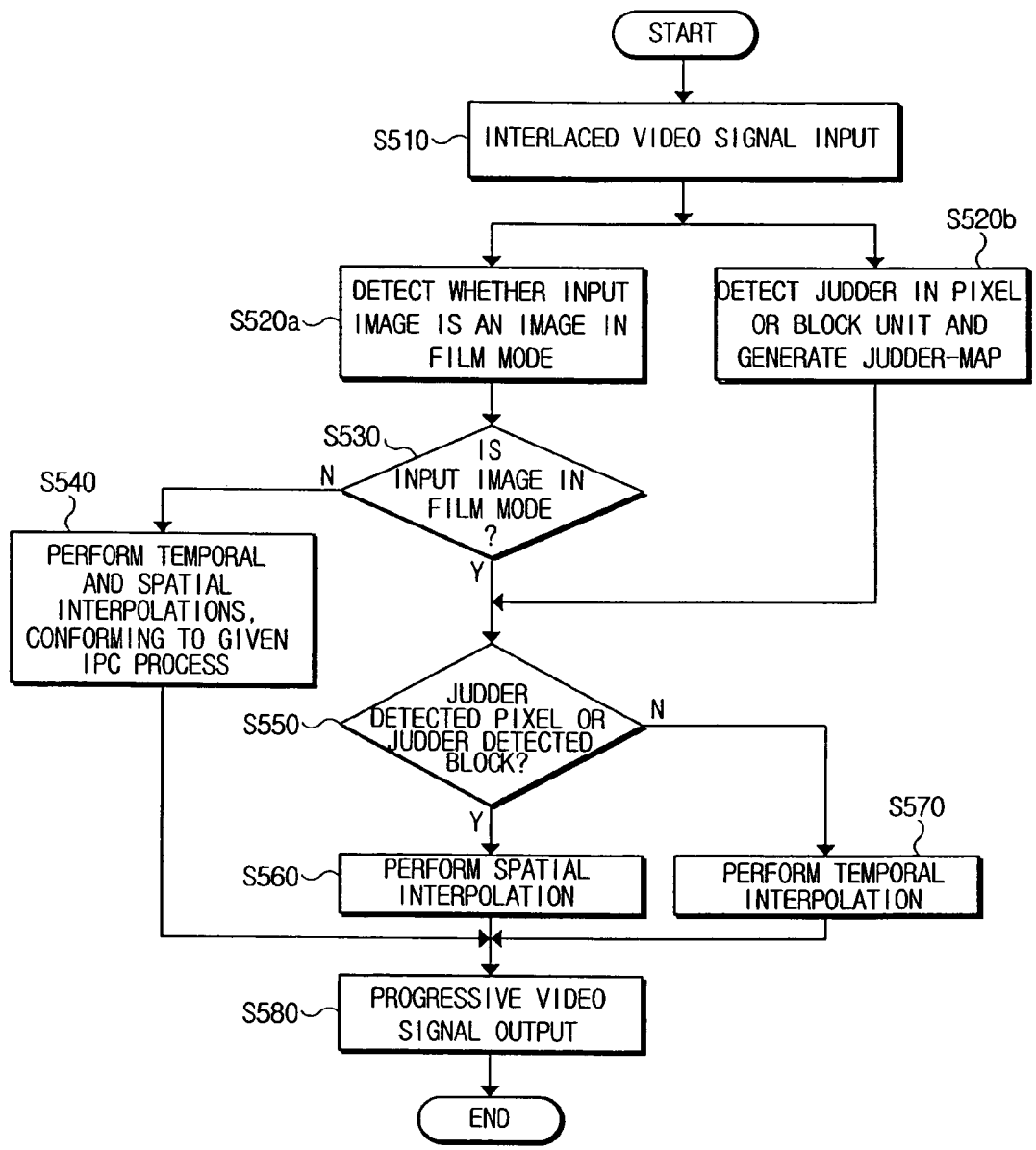

IMAGE PROCESSING APPARATUS USING JUDDER-MAP AND METHOD THEREOF

CROSS-REFERENCE TO RELATED APPLICATIONS

This application claims benefit under 35 U.S.C. § 119 from Korean Patent Application No. 2004-80324, filed Oct. 8, 2004, the disclosure of which is incorporated herein in its entirety by reference.

BACKGROUND OF THE INVENTION

1. Field of the Invention

The present general inventive concept relates to an image processing apparatus and a method thereof, and more specifically, to an image processing apparatus using a judder-map to prevent judder on CGI (Computer Graphic Imagery) or subtitles where pulldown technologies are not applied, and a method thereof.

2. Description of the Related Art

Image display devices usually operate in interlace scan or progressive scan mode. Interlace scanning, which is used in traditional TV systems, refers to a method of dividing each image frame into two fields and reading out lines in an odd/even sequence. The two fields are called the top/bottom fields, upper/lower fields, or odd/even fields. In contrast, progressive scanning (or non-interlace scan), which is generally used in computer monitors and digital TVs, refers to a method for representing moving images on a display screen, in which every pixel is represented in each frame and a full frame is drawn at one time.

For example, in 480-line NTSC (National Television System Committee) interlace scanning, a single frame is composed of two fields, each of 240 lines, presented every 1/60 of a second, which are interlaced to form a full picture (i.e., a 480-line image) every 1/30 second. Progressive scanning, on the other hand, draws a full picture (i.e., a 480-line image) every 1/60 second. Therefore, progressive scan images produce sharper, crisper edges of moving objects, whereas interlace scan images appear blurred on the edges of moving objects.

One of the most common examples of the use of the progressive scanning is motion picture film. Most movies released on DVD in recent years were originally captured on film. Unlike NTSC TVs, film is shown at 24 frames a second. Of course, it is possible to capture or store 24 original film frames directly on a DVD. However, the majority of image display devices, TVs for example, on the market create a picture using interlace scanning. Because of this trend, higher demands are being placed on the interlace scan DVDs, not the progressive scan DVDs.

Therefore, a 24-frame film in the progressive format needs to be converted to 60 fields in the interlace format. This is called 3:2 pulldown or telecine conversion. With the 3:2 pulldown method, two film frames at 24 Hz are converted to five fields at 60 Hz. In a case of transferring motion picture film to a video format, such as TV, based on PAL or SECAM system, 25 frames per second are converted into 50 fields, i.e., 2 fields per frame. This method of scanning 2 fields onto a frame is commonly referred to as 2:2 pulldown.

FIG. 1 is a diagram explaining 3:2 pulldown. Referring to FIG. 1, 24-frame progressive-scanned images per second are converted to interlaced images at 60 Hz. In other words, as can be seen in FIG. 1, 3 fields are produced from Frame 1, and two fields are produced from Frame 2. Overall, 5 fields are produced from every two frames.

Recently, there has been a gradual increase of image display devices using progressive scanning, and thus, it has become necessary to exchange data between display devices using different scan systems. In other words, there was a need to develop an IPC (Interlaced-to-Progressive Conversion) method converting an interlaced image to a progressive image. In the IPC process, if a field to be interpolated is a 3:2 pulldown format image, interlaced fields are combined to get a full progressive format image before they are 3:2 pulled down. Therefore, prior to the IPC, it is necessary to find out whether or not a field to be interpolated is a 3:2 pulldown image. Fortunately, there are many techniques for detecting 3:2 pulldown format images.

The following will now explain how to detect a 3:2 pulldown image.

Suppose that there are 10 fields, F1, F2, F3, F4, F5, F6, F7, F8, F9, and F10, which are 3:2 pulled down. Then, detection of a 3:2 pulldown image is accomplished by using the fact that the period of SAD (Sum of Absolute Difference) is 5. Given that two fields are separated by a period, the SAD of F1-F3, F6-F8 becomes extremely small (if there is no noise, the SAD is approximately zero). The SAD becomes very small because an original field is subtracted from a repeat field. Based on its regularity, the detection of a 3:2 pulldown image is accomplished by taking, per pixel, an absolute value of the subtraction between two fields that are always separated by 1/30 second, and summing the absolute value results for all the pixels to produce interim data. For instance, suppose that |F1-F3|=D1, |F2-F4|=D2, |F3-F4|=D3, . . . . Then, SAD, D1, and D6 have very small values, whereas the others have very large values. Moreover, the respective SADs are small, large, large, large, and large, showing some regularity.

However, when scenes are cut out the regularity of the SADs may disappear. In that case, judder results during the reverse 3:2 pulldown. Also, judder arises in CGI (Computer Graphic Imagery) or subtitles where 3:2 pulldown technologies are not applied.

SUMMARY OF THE INVENTION

The present general inventive concept provides an image processing apparatus using a judder-map to prevent judder arising in CGI (Computer Graphic Imagery) or subtitles where pulldown technologies are not applied, and a method thereof.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing an image processing apparatus using a judder-map, in which the apparatus includes a field storage block to receive an input interlaced video signal including an input image having a plurality of consecutive fields, a film detecting block to receive the plurality of consecutive fields from the field storage block and to determine whether the input image is an image in a film mode, a judder-map generating block to detect judder created on a pixel or block of neighboring fields among the plurality of consecutive fields provided from the field storage block and to generate a judder-map, and an image interpolating block to perform image interpolation using the judder-map if the input video signal is determined to be an image in the film mode and to generate and output a resultant progressive video signal.

The field storage block may include a current field storage to store a current field to be interpolated, and previous and next field storages to store previous and next fields, respectively, which come before and after the current field from a real time perspective.

The judder-map generating block may include a pixel unit judder detector to determine whether three consecutive line pixel values of the neighboring fields reveal judder characteristics to detect judder in a pixel unit and a judder-map storage to generate the judder-map based on judder information obtained by the pixel unit judder detector and to store the generated judder-map.

The pixel unit judder detector may include an interim value calculator to calculate an interim value of pixels that are located at the same position in a horizontal direction from three consecutive lines of two of the neighboring fields, a difference calculator to calculate a difference between the pixel value of an i-th line and the interim value calculated by the interim value calculator, and to calculate an absolute value of the difference, and a comparer to compare the absolute value of the difference calculated by the difference calculator with a predetermined critical value, and if the different value is greater than the predetermined critical value, to determine that judder exists on the pixel of an i-th line ($L_i$), and if the if the different value is not greater than the predetermined critical value, to determine that no judder exists on the pixel of the i-th line ($L_i$).

The judder-map generating block may further include a block unit judder detector to detect judder in a block unit of a predetermined size by computing a number of judder artifacts detected in the block and to compare the result with a predetermined critical value to determine whether judder is created on the block.

If the number of judder artifacts detected in the block of the predetermined size is greater than the predetermined critical value, the block unit judder detector may decide that judder is created on the block, and if the number of judder artifacts detected in the block is not greater than the predetermined critical value, the block unit judder detector may decide that no judder is created on the block.

The block unit judder detector may be disposed between the pixel unit judder detector and the judder-map storage.

The judder-map generating block may further include a judder region expander to expand a judder detecting region when the block unit judder detector detects judder in a block by designating blocks the block in which judder is detected as judder detected blocks.

The judder region expander may be disposed between the block unit judder detector and the judder-map storage.

The judder region expander may be disposed such that the judder-map storage is between the judder region expander and the block unit judder detector.

If the input image is an image in the film mode and judder is detected in a pixel or block within a field to be interpolated, the image interpolating block may perform spatial interpolation on the pixel or on the block of the field to be interpolated.

If the input image is an image in the film mode and no judder is detected in a pixel or block within the field to be interpolated, the image interpolating block may perform temporal interpolation on the pixel or on the block of the field to be interpolated.

If the input image is not an image in the film mode, the image interpolating block may perform temporal and spatial interpolations according to a predetermined IPC (interlaced-to-progressive conversion) method, irrespective of whether or not judder is detected.

The foregoing and/or other aspects of the present general inventive concept are also achieved by providing an image processing apparatus a judder map generating unit to detect judder in a predetermined region of fields of an input image, a film detecting unit to determine whether the input image is a film image, and an interpolation unit to perform spatial interpolation on the predetermined region when the input image is a film image and judder is detected in the predetermined region, to perform temporal interpolation on the predetermined region when the input image is a film image and judder is not detected in the predetermined region, and to perform one of spatial interpolation and temporal interpolation on the predetermined region according to a predetermined IPC (interlaced-to-progressive conversion) method when the input image is not a film image.

The foregoing and/or other aspects of the present general inventive concept are also achieved by providing an image processing apparatus to convert an input interlaced image into a progressive image, including a judder mapping unit to detect judder in an input image and to map out regions of the input image in which judder is detected, and an interpolation unit to interpolate the mapped out regions of the input image in which judder is detected using spatial interpolation and regions of the input image in which no judder is detected using temporal interpolation when the input image is a film image.

The foregoing and/or other aspects of the present general inventive concept are also achieved by providing an image processing method using a judder-map, in which the method includes receiving an input interlaced video signal including an input image having a plurality of consecutive fields and storing the input video signal, detecting whether the input image is an image in a film mode, detecting judder on a region of neighboring fields of the plurality of fields to generate a judder-map, if the input image is an image in the film mode, referring to the judder-map and determining whether judder is detected on a region within a field to be interpolated, and if judder is detected in the region within the field to be interpolated, performing spatial interpolation on the region, and if no judder is detected in the region within the filed to be interpolated performing temporal interpolation on the region, and outputting a resultant progressive video signal.

The method may further include if the input image is not an image in the film mode, performing spatial and temporal interpolations according to a predetermined IPC method.

The foregoing and/or other aspects of the present general inventive concept are also achieved by providing an image processing method, including detecting judder in regions of an input interlaced image and mapping out the regions in which judder is detected, determining whether the input interlaced image is a film image, and interpolating each region of the input interlaced image using one of spatial interpolation and temporal interpolation according to whether the input interlaced image is determined to be a film image and the mapped out regions of the input interlaced image in which judder is detected.

BRIEF DESCRIPTION OF THE DRAWINGS

These and/or other aspects of the present general inventive concept will become apparent and more readily appreciated from the following description of the embodiments, taken in conjunction with the accompanying drawings of which:

FIG. 5 is a flow chart illustrating an image processing method using a judder-map according to an embodiment of the present general inventive concept.

DETAILED DESCRIPTION OF THE PREFERRED EMBODIMENTS

Figure 1:
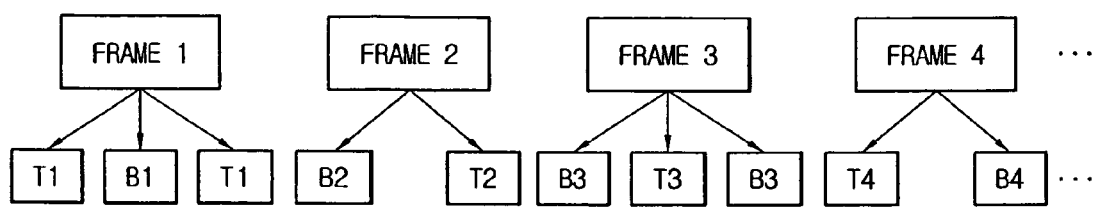
FIG. 1 is an explanatory diagram of 3:2 pulldown.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
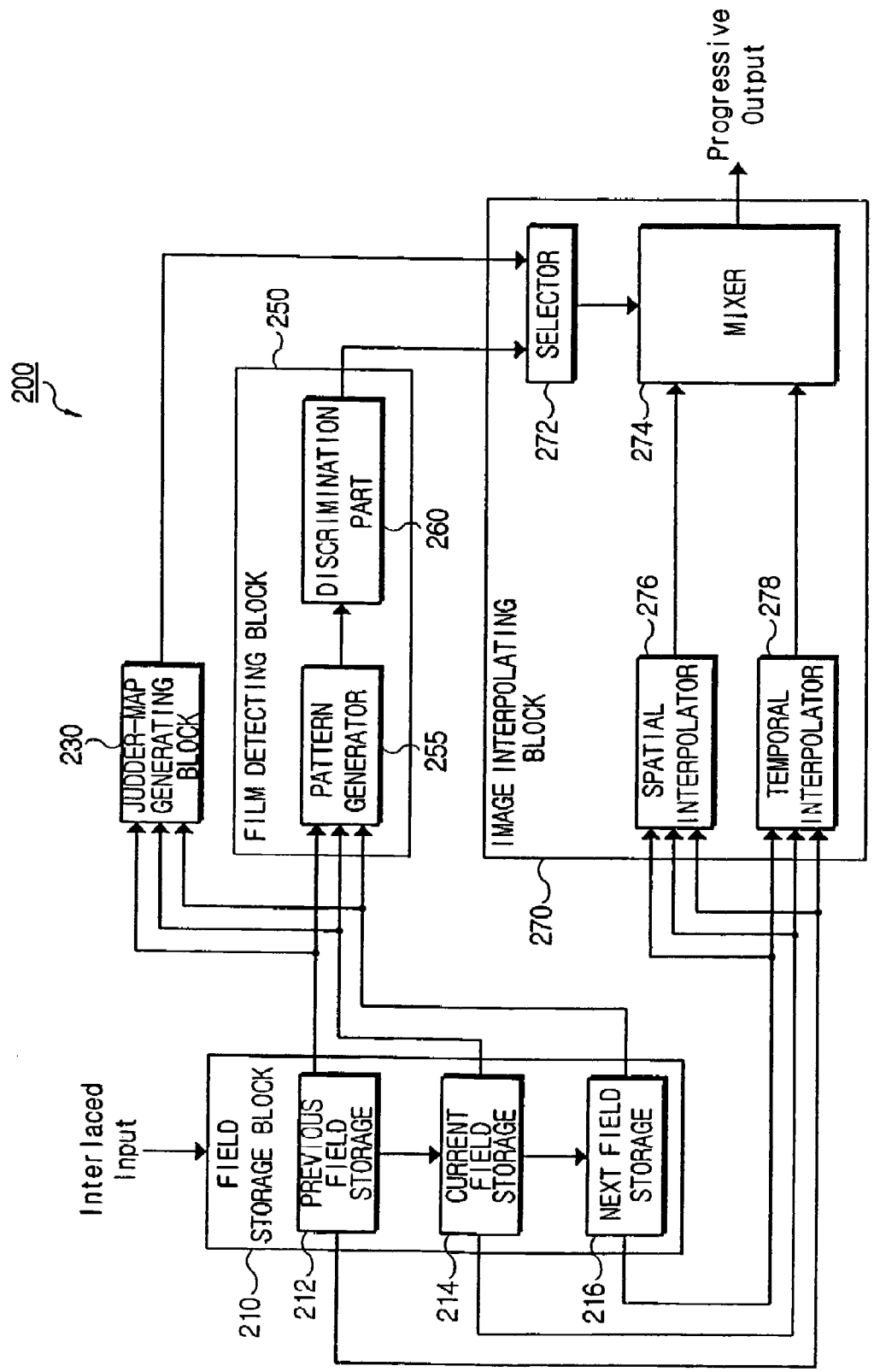
FIG. 2 is a schematic block diagram illustrating an image processing apparatus using a judder-map according to an embodiment of the present general inventive concept.

FIG. 2 is a schematic block diagram illustrating an image processing apparatus 200 using a judder-map according to an embodiment of the present general inventive concept. Referring to FIG. 2, the image processing apparatus 200 includes a field storage block 210, a judder-map generating block 230, a film detecting block 250, and an image interpolating block 270.

The field storage block 210 receives an input interlaced video signal, in which an input image includes a plurality of consecutive fields. Hereinafter, a field to be interpolated currently is referred to as a "current field," and fields before and after (from a real time perspective) the current field are referred to as a "previous field" and a "next field," respectively. The previous and next fields are reference fields of the current field. As illustrated in FIG. 2, the field storage block 210 includes a previous field storage 212 to store the previous field, a current field storage 214 to store the current field, and a next field storage 216 to store the next field that is input immediately after the current field.

The film detecting block 250 detects whether the input image is a film image produced by 3:2 pulldown or 2:2 pulldown. The film detecting block 250 includes a pattern generator 255 and a discrimination part 260. The pattern generator 255 computes a difference between pixel values of three consecutively input fields (i.e., the previous, current, and next fields) among the plurality of consecutive fields, and compares the result of the computation with a predetermined first critical value (T1) to generate a pattern.

The pattern generator 255 computes the difference between pixel values of two consecutive fields, such as the previous field and the current field, and if the result of the computation is greater than the predetermined first critical value (T1), the pattern generator 255 generates a "1," whereas if the result of the computation is not greater than the predetermined first critical value (T1), the pattern generator 255 generates a "0." Likewise, the pattern generator 255 computes the difference between pixel values of the current and next fields, and compares the result of the computation with the predetermined first critical value (T1) to generate a pattern.

The discrimination part 260 of the film detecting block 250 compares the pattern of the input image that is generated by the pattern generator 255 with a predetermined film image pattern and detects whether the input image is an image in a film mode based on the comparison. The detection result of the film detecting block 250 is then provided to the image interpolating block 270. The film mode refers to an image produced by 3:2 pulldown or 2:2 pulldown.

The judder-map generating block 230 detects judder in a certain pixel or block of pixels in neighboring fields (i.e., the previous, current, and next fields) among the consecutive fields input to the field storage block 210, and generates a judder-map based on the result of the detection. Here, the judder-map is an information record of a region where judder (or motion artifacts) is detected.

The image interpolating block 270 performs image interpolation based on whether the input image is determined to be an image in the film mode by the film detecting block 250 and the judder-map generated by the judder-map generating block 230. For example, if the film detecting block 250 determines that the input image is the image in the film mode, the image interpolating block 270 performs image interpolation in a pixel unit or in a block unit of the current field using the judder-map generated by the judder-map generating block 230.

The image interpolating block 270 includes a selector 272, a mixer 274, a spatial interpolator 276, and a temporal interpolator 278. The selector 272 controls the mixer 274 to perform image interpolation based on the detection result of the film detecting block 250 and the judder-map generated by the judder-map generating block 230. The spatial interpolator 276 and the temporal interpolator 278 respectively perform spatial interpolation and temporal interpolation on pixels or blocks of the current field of the input image, and the mixer 274 combines the pixels or blocks interpolated by the spatial interpolator 276 and the temporal interpolator 278 to form a progressive video signal.

Accordingly, if the input image is not an image in the film mode, the image interpolating block 270 performs spatial and temporal interpolations according to a predetermined IPC process. That is, the mixer 274 combines the pixels or blocks of the current field interpolated by the spatial interpolator 276 and the temporal interpolator 278 according to the predetermined IPC process to output the progressive video signal.

On the other hand, if the input image is an image in the film mode, the image interpolating block 270 performs image interpolation based on the judder-map generated by the judder-map generating block 230. That is, when judder is detected in a certain pixel or block of the current field, the spatial interpolator 276 performs spatial interpolation on the certain pixel or block in which the judder is detected, and the mixer 274, under the control of the selector 272, inputs the spatially interpolated pixel or block of the current field from the spatial interpolator 276.

However, if the judder is not detected in a pixel or in a block, the temporal interpolator 278 performs temporal interpolation on the pixel or block in which the judder is not detected, and the mixer 274, under the control of the selector 272, inputs the temporally interpolated pixel or block that corresponds to the previous or the next field from the temporal interpolator 278. The mixer 274 mixes the pixels or blocks interpolated in the spatial and temporal interpolators 276 and 278 and outputs a progressive video signal.

Figure 3:
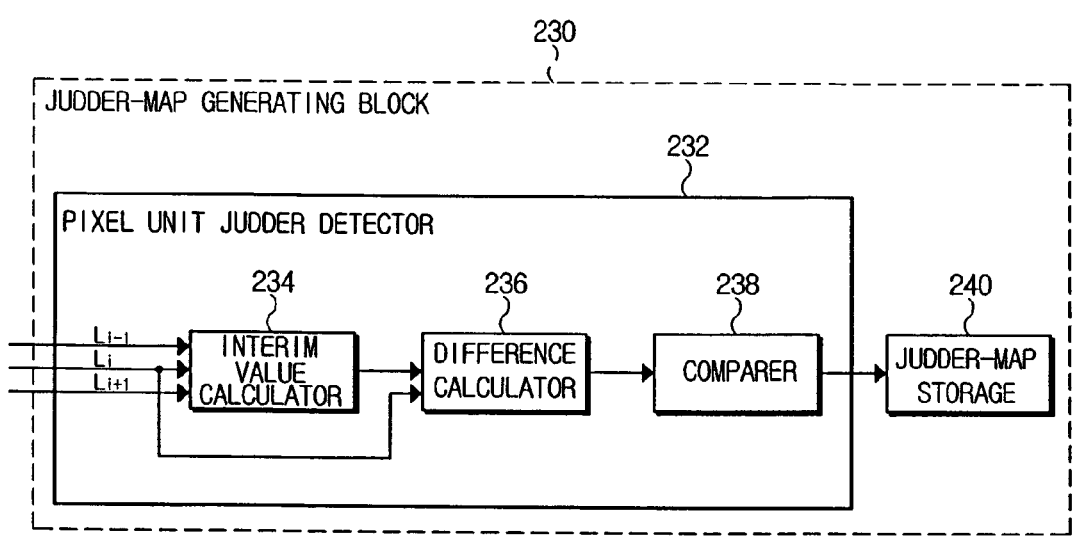
FIG. 3 is a schematic block diagram illustrating a judder-map generating block of the image processing apparatus of FIG. 2 according to an embodiment of the present general inventive concept.

FIG. 3 is a schematic block diagram illustrating a judder-map generating block 230 according to an embodiment of the present general inventive concept. Referring to FIG. 3, the judder-map generating block 230 according to this embodiment includes a pixel unit judder detector 232 which detects judder of a pixel by determining whether three consecutive line pixel values of neighboring fields (i.e., the previous, current, and next fields) reveal motion blur or judder, and generates a judder map based on the detected judder. The judder-map generating block 230 also includes a judder-map storage 240 to store the judder-map based on the judder detected by the pixel unit judder detector 232.

The pixel unit judder detector 232 includes an interim value calculator 234, a difference calculator 236, and a comparer 238. The interim value calculator 234 calculates an interim value of pixels that are located at the same position in the horizontal direction from the three consecutive lines of two neighboring fields, such as for example, the previous and current fields, and outputs the result of the calculation. For example, suppose that there are three pixels at the same position in the horizontal direction from the three consecutive lines, and pixel values thereof are (10, 5, 6). The interim value calculator 234 first arranges the pixel values in order of size, such as, (10, 6, 5), and then calculates an interim value of the pixel values. For example, when the pixel values in order of size are (10, 6, 5), the interim value is 6. When the two neighboring fields are the previous field and the current field, the three consecutive lines indicate an Li−1-th line of the previous field, an Li-th line of the current field, and an Li+1-th line of the previous field.

The difference calculator 236 calculates a difference between the pixel value of a current line (Li) and the interim value calculated by the interim value calculator 234, takes an absolute value of the calculated difference, and outputs the absolute value to the comparer 238. The comparer 238 receives the absolute value of the difference, which represents an amount of judder.

The comparer 238 compares the absolute value of the difference received from the difference calculator 236 with a predetermined second critical value (T2), generates the judder-map based on the comparison, and outputs the generated judder-map to the judder-map storage 240. For example, if the absolute value of the difference is greater than the predetermined second critical value (T2), the comparer 238 determines that there is judder in the pixel of the input image, whereas if the difference is not greater than the predetermined second critical value (T2), the comparer 238 determines that there is no judder in the input image. This judder information (i.e., the judder-map) determined by the comparer 238 is input to the judder-map storage 240 which stores the judder information and provides the stored judder information to the image interpolating block 270.

Figure 4A:
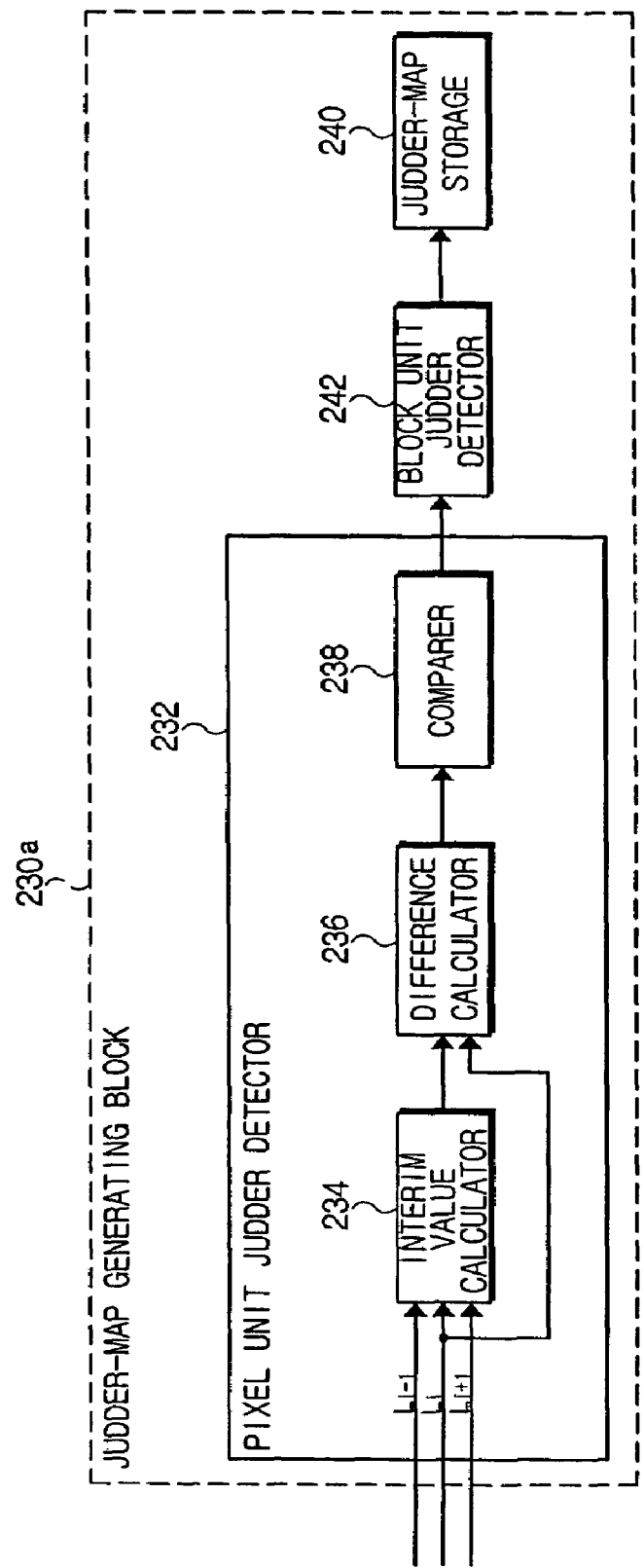
FIG. 4A to FIG. 4C are schematic block diagrams, each illustrating a judder-map generating block according to another embodiment of the present general inventive concept.
Figure 4B:
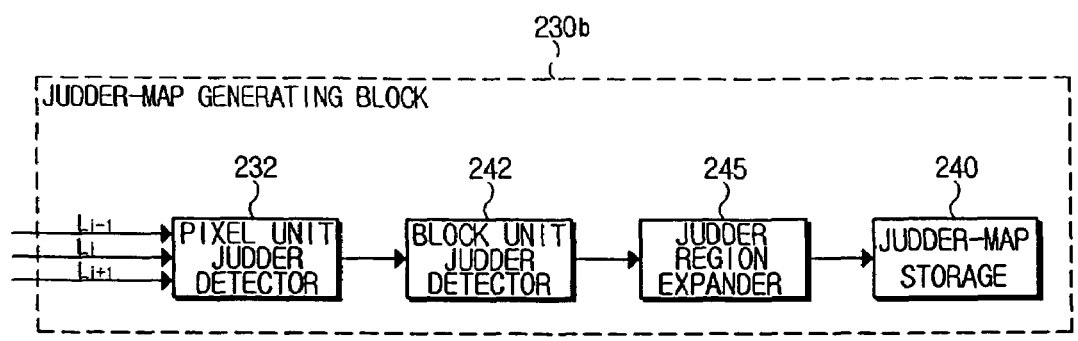
Figure 4C:
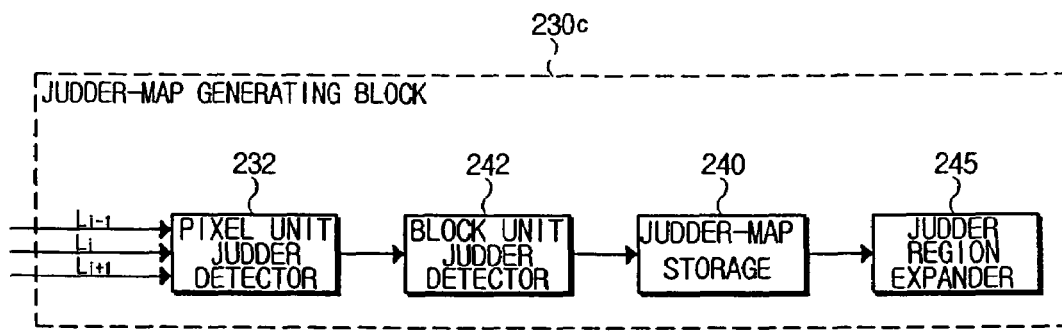

FIG. 4A to FIG. 4C are schematic block diagrams, respectively illustrating judder-map generating blocks 230a to 230c according to other embodiments of the present general inventive concept. Referring to FIG. 4A, the judder-map generating block 230a according to the embodiment of FIG. 4A is similar to the judder-map generation block 230 of the embodiment of FIG. 3, and further includes a block unit judder detector 242 disposed between the pixel unit judder detector 232 and the judder-map storage 240.

The block unit judder detector 242 detects judder in a predetermined size block of the input image by computing a number of judder artifacts detected in the block and comparing the computed number of judder artifacts with a predetermined third critical value (T3). For example, if the number of judder artifacts detected in the block is greater than the predetermined third critical value (T3), the block unit judder detector 242 determines that there is judder in the block, whereas if the number of judder artifacts detected in the block is not greater than the predetermined third critical value (T3), the block unit judder detector 242 determines that there is no judder in the block. Here, the size of the block can be determined by a user or a manufacturer of the image processing apparatus 200.

Referring to FIG. 4B, the judder-map generating block 230b according to the embodiment of FIG. 4B is similar to the judder-map generating block 230a of FIG. 4A and further includes a judder region expander 245 that is disposed between the block unit judder detector 242 and the judder-map storage 240. Referring to FIG. 4C, the judder-map generating block 230c according to the embodiment of FIG. 4C is similar to the judder-map generating block 230a of FIG. 4A and further includes the judder region expander 245 disposed such that the judder-map storage 240 is between the judder region expander 245 and the block unit judder detector 242. The judder region expander 245 expands a region in which judder is detected based on a fact that judder is not scattered but usually found at edges of the input image.

Accordingly, if judder is detected in a certain pixel or block by the pixel unit judder detector 232 or the block unit judder detector 242, the judder region expander 245 designates four blocks (for example, upper, lower, right and left sides) surrounding the pixel or block in which the judder is detected to expand a region around the pixel or block in which the judder is detected.

FIG. 5 is a flow chart illustrating an image processing method using a judder-map according to an embodiment of the present general inventive concept. Referring to FIGS. 2 and 5, the field storage block 210 receives an interlaced video signal input from an external image source (operation S510).

The film detecting block 250 receives consecutive fields of an image of the input interlaced video signal from the field storage block 210, and detects whether the input image is an image in a film mode image produced by 3:2 pulldown or 2:2 pulldown (operation S520a). The detection result regarding whether the input image is an image in the film mode is provided to the selector 272 of the image interpolating block 270.

The judder-map generating block 230 detects judder in a pixel or block in neighboring fields among the consecutive fields input to the field storage block 210, and generates a judder-map based on the result of the detection (operation S520b). The judder-map is an information record of a region where judder (or motion artifacts) is detected. The method of generating a judder-map is explained above, and therefore, a detailed description will not be repeated here. The judder-map from the judder-map generating block 230 is provided to the selector 272 of the image interpolating block 270.

If it is determined by the film detecting block 250 that the input image is not an image in the film mode (operation S530), the image interpolating block 270 performs temporal and spatial interpolations according to the predetermined IPC process (operation S540).

On the other hand, if it is determined by the film detecting block 250 that the input image is an image in the film mode (operation S530), the selector 272 in the image interpolating block 270 checks whether there is judder in the current pixel or block using the judder-map provided from the judder-map generating block 230 (operation S550). As described above, the judder detected block can include surrounding blocks that are also designated as the judder detected block by the judder region expander 245 (see FIGS. 4B and 4C).

At operation S550, if judder is detected in a pixel or a block within a field to be interpolated, the image interpolating block 270 performs spatial interpolation on the pixel or on the block in which the judder is detected (operation S560). Accordingly, the mixer 274, under the control of the selector 272, inputs a spatially interpolated pixel or block of the current field from the spatial interpolator 276 and outputs a progressive video signal (operation S580).

On the other hand, at operation S550, if no judder is detected in a pixel or in a block within the field to be interpolated, the image interpolating block 270 performs temporal interpolation on the pixel or the block in which no judder is detected (operation S570). Accordingly, the mixer 274, under the control of the selector 272, inputs a temporally interpolated pixel or a block that corresponds to the previous or the next field from the temporal interpolator 278 and outputs a progressive video signal (operation S580).

Accordingly, no judder appears on CGI (Computer Graphic Imagery) or subtitles, and it is possible to convert an interlaced video signal to a progressive video signal.

The present general inventive concept can also be embodied as computer-readable codes on a computer-readable recording medium.

As described above, an image processing apparatus using a judder-map according to the embodiments of the present general inventive concept prevents the creation of judder on CGI or subtitles.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image processing apparatus using a judder-map, the apparatus comprising:
    a field storage block to receive an input interlaced video signal including an input image having a plurality of consecutive fields;
    a film detecting block to receive the plurality of consecutive fields from the field storage block and to determine whether the input image is an image in a film mode;
    a judder-map generating block to detect judder created on a pixel or block of neighboring fields among the plurality of consecutive fields provided from the field storage block and to generate a judder-map based on the detected judder; and
    an image interpolating block to perform image interpolation using the judder-map if the input image is determined to be an image in the film mode, and to generate and output a resultant progressive video signal.

2. The apparatus according to claim 1, wherein the field storage block comprises:
    a current field storage to store a current field to be interpolated; and
    previous and next field storages to store previous and next fields, respectively, which come before and after the current field from a real time perspective.

3. The apparatus according to claim 1, wherein the judder-map generating block comprises:
    a pixel unit judder detector to determine whether three consecutive line pixel values of the neighboring fields reveal judder characteristics to detect judder in a pixel unit; and
    a judder-map storage to generate the judder-map based on judder information obtained by the pixel unit judder detector and to store the generated judder-map.

4. The apparatus according to claim 3, wherein the pixel unit judder detector comprises:
    an interim value calculator to calculate an interim value of pixels that are located at the same position in a horizontal direction from three consecutive lines of two of the neighboring fields;
    a difference calculator to calculate a difference between the pixel value of an i-th line and the interim value calculated by the interim value calculator and to calculate an absolute value of the difference; and
    a comparer to compare the absolute value of the difference calculated by the difference calculator with a predetermined critical value, and if the absolute value of the difference is greater than the predetermined critical value, to determine that judder exists on the pixel of the i-th line, and if the different value is not greater than the predetermined critical value, to determine that no judder exists on the pixel of the i-th line.

5. The apparatus according to claim 3, wherein the judder-map generating block further comprises:
    a block unit judder detector to detect judder in a block unit of a predetermined size by computing a number of judder artifacts detected in the block and to compare the number of judder artifacts detected in the block with a predetermined critical value to determine whether judder is created on the block.

6. The apparatus according to claim 5, wherein if the number of judder artifacts detected in the block of the predetermined size is greater than a predetermined critical value, the block unit judder detector determines that judder is created on the block, and if the number of judder artifacts detected in the block is not greater than the predetermined critical value, the block unit judder detector determines that no judder is created on the block.

7. The apparatus according to claim 5, wherein the block unit judder detector is disposed between the pixel unit judder detector and the judder-map storage.

8. The apparatus according to claim 5, wherein the judder-map generating block further comprises a judder region expander to expand a judder detecting region when the block unit judder detector detects judder in a block by designating blocks surrounding the block in which judder is detected as judder detected blocks.

9. The apparatus according to claim 8, wherein the judder region expander is disposed between the block unit judder detector and the judder-map storage.

10. The apparatus according to claim 8, wherein the judder region expander is disposed such that the judder-map storage is between the judder region expander and the block unit judder detector.

11. The apparatus according to claim 1, wherein if the input image is an image in the film mode and judder is detected in a pixel or a block within a field to be interpolated, the image interpolating block performs spatial interpolation on the pixel or on the block of the field to be interpolated.

12. The apparatus according to claim 1, wherein if the input video signal is the image in the film mode and no judder is detected in a pixel or block within a field to be interpolated, the image interpolating block performs temporal interpolation on the pixel or on the block of the field to be interpolated.

13. The apparatus according to claim 1, wherein, if the input video signal is not the image in the film mode, the image interpolating block performs temporal and spatial interpolations according to a predetermined IPC (interlaced-to-progressive conversion) method, irrespective of whether judder is detected.

14. An image processing apparatus, comprising:
    a judder map generating unit to detect judder in a predetermined region of fields of an input image;
    a film detecting unit to determine whether the input image is a film image; and
    an interpolation unit to perform spatial interpolation on the predetermined region when the input image is a film image and judder is detected in the predetermined region, to perform temporal interpolation on the predetermined region when the input image is a film image and judder is not detected in the predetermined region, and to perform one of spatial interpolation and temporal interpolation on the predetermined region according to a predetermined IPO (interlaced-to-progressive conversion) method when the input image is not a film image.

15. The image processing apparatus of claim 14, wherein the judder map generating unit comprises:
   pixel unit judder detector to detect judder in pixels of the fields of the input image; and
   a judder map storage to store information regarding the pixels in which judder is detected to generate the judder map.

16. The image processing apparatus of claim 15, wherein the judder map generating unit further comprises:
   a block unit judder detector to detect judder in blocks of pixels of the fields of the input image according to the judder detected in the pixels by the pixel unit judder detector.

17. The image processing apparatus of claim 16, wherein the judder map generating unit further comprises:
   a judder region expander to designate an area surrounding a block of pixels in which judder is detected by the block unit judder detector as having judder.

18. The image processing apparatus of claim 16, wherein the interpolation unit combines spatially interpolated regions and temporally interpolated regions to convert the input image to a progressive image.

19. The image processing apparatus of claim 14, wherein the film detecting unit generates a pattern according to pixel differences of consecutive fields of the input image and compares the pattern to a predetermined film image pattern to determined whether the input image is a film image.

20. The image processing apparatus of claim 19, wherein the predetermined film image pattern comprises at least one of a 3:2 pulldown pattern and a 2:2 pulldown pattern.

21. An image processing apparatus to convert an input interlaced image into a progressive image, comprising:
   a judder mapping unit to detect judder in an input image and to map out regions of the input image in which judder is detected; and
   an interpolation unit to interpolate the mapped out regions of the input image in which judder is detected using spatial interpolation and regions of the input image in which no judder is detected using temporal interpolation when the input image is a film image.

22. The image processing apparatus of claim 21, wherein the interpolation unit interpolates the input image according to a predetermined IPC (interlaced-to-progressive conversion) method when the input image is not a film image.

23. The image processing apparatus of claim 21, wherein the interpolation unit comprises:
   a film detecting unit to determine whether the input image is a film image.

24. An image processing method using a judder-map, the method comprising:
   receiving an input interlaced video signal including an input image having a plurality of consecutive fields, and storing the video signal;
   detecting whether the input image is an image in a film mode and detecting judder on a region of neighboring fields of the plurality of consecutive fields to generate a judder-map;
   if the input image is an image in the film mode, referring to the judder-map and determining whether judder is detected on a region within a field to be interpolated; and
   if judder is detected in the region within the field to be interpolated, performing spatial interpolation on the region, and if no judder is detected in the region within the field to be interpolated, performing temporal interpolation on the region, and outputting a resultant progressive video signal.

25. The method according to claim 24, further comprising:
   if the input image is not an image in the film mode, performing spatial and temporal interpolations according to a predetermined IPC (interlaced-to-progressive conversion) method.

26. An image processing method, comprising:
   detecting judder in regions of an input interlaced image and mapping out the regions in which judder is detected;
   determining whether the input interlaced image is a film image; and
   interpolating each region of the input interlaced image using one of spatial interpolation and temporal interpolation according to whether the input interlaced image is determined to be a film image and the mapped out regions of the input interlaced image in which judder is detected.

27. The image processing method of claim 26, wherein the interpolating of each region of the input interlaced image comprises:
   interpolating the regions of the input interlaced image using at least one of spatial interpolation and temporal interpolation according to a predetermined method when it is determined that the input interlaced image is not a film image; and interpolating the mapped out regions in which the judder is detected using spatial interpolation and regions in which no judder is detected using temporal interpolation when the input interlaced image is a film image.

28. The image processing method of claim 26, further comprising:
   combining each interpolated region of the input interlaced image to output a progressive image.

29. A computer readable recording medium to perform an image processing method, the method comprising:
   receiving an input interlaced video signal including and input image having a plurality of consecutive fields, and storing the video signal;
   detecting whether the input image is an image in a film mode and detecting judder on a region of neighboring fields of the plurality of consecutive fields to generate a judder-map;
   if the input image is an image in the film mode, referring to the judder-map and determining whether judder is detected on a region within a field to be interpolated; and
   if judder is detected in the region within the field to be interpolated, performing spatial interpolation on the region, and if no judder is detected in the region within the field to be interpolated, performing temporal interpolation on the region, and outputting a resultant progressive video signal.

30. A computer readable recording medium to perform an image processing method, the method comprising:
   detecting judder in regions of an input interlaced image and mapping out the regions in which judder is detected;
   determining whether the input interlaced image is a film image; and
   interpolating each region of the input interlaced image using one of spatial interpolation and temporal interpolation according to whether the input interlaced image is determined to be a film image and the mapped out regions of the input interlaced image in which judder is detected.

* * * * *